United States Patent [19]
Gauthie-Jaques et al.

[11] Patent Number: 6,054,169
[45] Date of Patent: Apr. 25, 2000

[54] PROCESS FOR THE PRODUCTION OF A KIWI JUICE AND PRODUCT THEREOF

[75] Inventors: Alexandre Gauthie-Jaques, Lausanne; Karlheinz Bortlik, Savigny, both of Switzerland

[73] Assignee: Nestec S.A., Vevey, Switzerland

[21] Appl. No.: 09/301,616

[22] Filed: Apr. 29, 1999

[30] Foreign Application Priority Data

May 2, 1998 [EP] European Pat. Off. .............. 98108011

[51] Int. Cl.⁷ ............................... A23L 1/025; A23L 2/04
[52] U.S. Cl. ........................ 426/599; 426/51; 426/330.1; 426/495; 426/615
[58] Field of Search ................................... 426/51, 330.5, 426/495, 599, 615

[56] References Cited

U.S. PATENT DOCUMENTS 5,232,726  8/1993  Clark et al. .............................. 426/599
5,658,610  8/1997  Bergman et al. ........................ 426/899

FOREIGN PATENT DOCUMENTS 0 480 422  4/1992  European Pat. Off. .
0 485 193  5/1992  European Pat. Off. .
97/38591  10/1997  WIPO .

*Primary Examiner*—Helen Pratt
*Attorney, Agent, or Firm*—Pennie & Edmonds LLP

[57] ABSTRACT

The present invention relates to a process for the production of a kiwi juice while preserving the original color. The process includes peeling the kiwis, subjecting the kiwis to a pressure treatment at between about 100 and 800 MPa for a period of at least 10 seconds, allowing the kiwis to stand for at least about 24 hours at refrigeration temperature, crushing the kiwis into a purée, and clarifying the purée in order to obtain a kiwi juice therefrom. The juice can be pasteurized and filled into containers. The present invention also relates to the kiwi juice that is made by the process.

8 Claims, No Drawings

PROCESS FOR THE PRODUCTION OF A KIWI JUICE AND PRODUCT THEREOF

TECHNICAL FIELD

The present invention relates to a process for the processing and production of kiwi juice.

BACKGROUND ART

In producing a kiwi fruit juice care must be taken to avoid discoloration of the fruit before the juice drink is made. For example, European Patent Application 485 193 discloses a process for the production of kiwi purée, in which the pulp is sweetened with a sweetening agent so as to avoid browning of the kiwi purée. One disadvantage of this process is that it requires the addition of an exogenous additive to the fruit, which may damage its natural attributes. Thus, there is a need for a process to produce a kiwi fruit juice that avoids the addition of such exogenous additives, but in which it nevertheless makes it possible to preserve the original color of the kiwi fruit.

SUMMARY OF THE INVENTION

The present invention now provides a process for the production of a kiwi juice while preserving the original color of the kiwi. Instead of introducing additives, this process is based on a physical treatment of the kiwis. The process includes peeling the kiwis, subjecting the peeled kiwis to a pressure treatment at between about 100 and 800 MPa for a period of at least about 10 seconds, allowing the peeled kiwis to stand for at least about 24 hours at a refrigeration temperature, crushing the peeled kiwis into a purée, and clarifying the purée in order to make a kiwi juice therefrom.

In one embodiment, the peeled kiwis can be cut into slices before subjecting the kiwi fruits to the pressure treatment. Preferred pressures in this treatment range from about 200 and 400 MPa, and the time of the pressure treatment is preferably conducted for a duration of between about 10 seconds and one minute.

In this process, the peeled kiwis are allowed to preferably stand for about 24 to 48 hours at a refrigeration temperature of between about 4 and 12° C., and clarification of the purée may be performed by centrifugation or filtration. The final steps of the process comprise pasteurizing the juice at a temperature of between about 70 and 80° C. and then filling the juice into containers on a highly hygienic line or an aseptic line.

The present invention also relates to the kiwi juice that is prepared according to this novel process.

Detailed Description of the Preferred Embodiments

It is known that kiwi fruits contain an enzyme, polyphenol oxidase (PPO), which is responsible for the browning of its fruit juice and purée. The present invention is therefore to inactivate this enzyme so as to reduce the abovementioned browning problem completely or in a large part. The inactivation of the enzyme is achieved by virtue of a physical treatment at high pressure, rather than a chemical one using additives.

The type of kiwi fruit used is not critical. It is possible to use any type of kiwi fruit cultivated worldwide. It is of course preferable that the kiwi fruits reach a degree of ripening which gives them the qualities required to make a juice therefrom. The kiwis are normally peeled, because it is necessary to eliminate the skin and the hair of the kiwi fruits from the puree that is subsequently made.

Any type of pressurizing apparatus can be used for the pressure treatment of the kiwi fruits. An isostatic cold press or any similar machine which allows the kiwi fruits to be placed under pressure can be used. These machines are well known in the art for other uses and need not be described in further detail here.

The kiwi fruits can be crushed by any conventional crushing machine used to crush fruit and form a purée. These machines are also well known to those of ordinary skill in the art. The method of crushing is not at all critical and any machine having the appropriate crushing capability can be used.

The kiwi purée that is formed is normally clarified to obtain the juice therefrom. The clarification step can include centrifugation, filtration or any other separation process known to those of ordinary skill in the art.

The resultant kiwi juice prepared according to the invention is then ready to be packaged, for example in a carton or any other container. Before filling the container, the kiwi juice should be pasteurized at a temperature of between about 70 and 80° C. The filling is then carried out conventionally on a highly hygienic line or an aseptic line.

According to the invention, the kiwi fruits may be pressure treated as whole fruits or after being cut into slices. In any case, the process of the present invention leads to the unexpected result that there is no browning of the kiwi juice during the manufacture of the juice.

The pressure treatment should be carried out at a pressure of at least about 100 MPa, and preferably at a pressure of between about 200 and 400 MPa. Thus, the pressure range is perfectly accessible in an inexpensive manner, and can be achieved using equipment that is readily available. The duration of the pressure treatment is normally between about 10 seconds and one minute. Normally, pressure values on the order of about 800 to 900 MPa are used to deactivate PPO.

It is important according to the process of the present invention to allow the treated kiwi fruits to stand before being crushed. If the kiwi fruits are not allowed to stand before being crushed, proper inactivation of PPO will not be achieved. The period for allowing the kiwis to stand is between about 24 and 48 hours at refrigeration temperature. Refrigeration temperature is understood to mean in the present description temperatures below about 15° C. Typically, these temperatures range from between about 0 and 14° C., and preferably from between about 4 and 12° C.

It is also important according to the present invention to monitor the activity of polyphenol oxidase. The polyphenol oxidase activity is analyzed at 480 nm according to the Leuba method (1977) using a phosphate buffer at pH of 6 with L-DOPA (3-(3,4-dihydroxyphenyl)-L-analine) (commercially available from Fluka Chemical Corp. of Milwaukee, Wis.) as the substrate. The absorption level is measured with a Uvikon 930 spectrophotometer (commercially available from Kontron Instruments Ltd. of the United Kingdom). Measurements are reported in absorbance units (a.u.) per microgram of protein.

EXAMPLES

The invention is further defined by reference to the following examples describing in detail the methods of the present invention. The examples are representative, and should not be construed to limit the scope of the invention in any way.

Example 1

Peeled kiwi fruits were prepared, cut into slices and subjected to treatment under pressure. The kiwi fruits were then crushed and the juice separated from the pulp by filtration. The separation was carried out so as to be able to perform the measurement of polyphenol oxidase (PPO) activity. The sliced kiwi fruits were treated under pressures of 0, 100 and 380 MPa for a time of 30 seconds. Measurements of PPO activity were performed without allowing the kiwi fruits to stand, after allowing them to stand for one day, and upon allowing them to stand for two days before being crushed.

For fruits which were not allowed to stand before crushing, the PPO activity, obtained after storing the kiwi juice for seven days, was measure to be between about 0.010 and 0.020 a.u. per microgram of protein, regardless of the treatment pressure (i.e., whether it was 0, 100 or 380 MPa). In contrast, if the kiwi fruits were allowed to stand for 24 hours (one day), after the 380 MPa pressure treatment, there was no trace of PPO activity, even after a relatively long storage of the kiwi juice (i.e., more than 3 weeks). For the kiwi fruits which were not treated under pressure, however, a PPO activity of 0.05 a.u. per microgram of protein was obtained after storing the kiwi juice for 7 days. When the same experiment was repeated with kiwi fruits which were allowed to stand for two days after the 380 MPa pressure treatment, there was no longer any trace of PPO in the kiwi juice even after long storage. For the kiwi fruits which were not treated under pressure, a PPO activity of 0.04 a.u. per microgram of protein was obtained after storing the kiwi juice for only 7 days.

Example 2

The same operations were performed as above, but instead of working with pieces of kiwi slices, a juice was made from whole fruits and the resulting kiwi juice was subjected to the pressure treatment.

The kiwi juice was subjected, in this example, to pressures of 0, 400 and 600 MPa and measurements of PPO activity were carried out as in the preceding example on the kiwi juice.

The pressure treatment was carried out for 30 seconds. Without the pressure treatment, a value for PPO activity of 0.3 a.u. per microgram of protein was obtained after storing the product for 7 days. With a pressure treatment at 400 MPa, a value for PPO activity of 0.2 a.u. per microgram of protein was obtained. With the 600 MPa pressure treatment, a value of 0.1 a.u. per microgram of protein was obtained. It is further observed that if the duration of the pressure treatment is increased, the PPO activity widely exceeds the activity measured in the untreated juices. Thus, it is necessary according to the invention to treat the whole fruit or the fruit cut into slices with pressure, rather than to just pressure treat the fruit juice.

What is claimed is:

1. A process for the production of a kiwi juice while preserving the original color of the kiwi juice, which comprises:

peeling kiwi fruits;

pressure treating the peeled kiwi fruits at a pressure of between about 100 and 800 MPa for a period of at least about 10 seconds;

allowing the peeled kiwis to stand for at least about 24 hours at refrigeration temperature;

crushing the peeled kiwis into a puree; and clarifying the purée in order to obtain kiwi juice therefrom.

2. The process according to claim 1, which further comprises slicing the peeled kiwi fruits before subjecting the kiwi fruits to the pressure treatment.

3. The process according to claim 1, wherein the peeled kiwi fruits are subjected to a pressure of between about 200 and 400 MPa.

4. The process according to claim 1, wherein the pressure treatment is conducted for a duration of between about 10 seconds and one minute.

5. The process according to claim 1, wherein the peeled kiwis are allowed to stand for about 24 to 48 hours at a refrigeration temperature of between about 4 and 12° C.

6. The process according to claim 1, wherein the clarification of the purée is performed by centrifugation or filtration.

7. The process according to claim 1, further comprising pasteurizing the juice at a temperature of between about 70 and 80° C. and then filling the juice into containers.

8. A kiwi juice prepared according to the process of claim 1.

* * * * *